United States Patent [19]

Uomoti et al.

[11] Patent Number: 4,765,532
[45] Date of Patent: Aug. 23, 1988

[54] METHOD OF AND APPARATUS FOR CONNECTING METAL STRIPS

[75] Inventors: Akiyoshi Uomoti; Hiromi Tajiri; Nobuyoshi Nakatani; Masafumi Daizumoto, all of Hyogo, Japan

[73] Assignee: Mitsubishi Denki Kabushiki Kaisha, Tokyo, Japan

[21] Appl. No.: 8,620

[22] Filed: Jan. 29, 1987

[30] Foreign Application Priority Data

May 31, 1986 [JP] Japan ................... 61-126491

[51] Int. Cl.⁴ ..................... B23K 37/00; B23K 31/02
[52] U.S. Cl. ................................ 228/212; 228/5.7
[58] Field of Search ............ 228/212, 5.7, 13, 15.1, 228/49.1, 49.4, 125, 19

[56] References Cited

U.S. PATENT DOCUMENTS 3,399,450  9/1968  Mize ..................... 228/212
3,915,368 10/1975  Ulmer .................... 228/212
4,304,977 12/1981  Hanai .................... 228/5.7
4,706,871 11/1987  Kajiwara ................. 228/5.7

FOREIGN PATENT DOCUMENTS

2422295 11/1974  Fed. Rep. of Germany ....... 228/5.7
0022478  2/1980  Japan ..................... 228/5.7

Primary Examiner—Kurt Rowan
Attorney, Agent, or Firm—Wolf, Greenfield & Sacks

[57] ABSTRACT

A metal strip connecting method for welding the tail end of a preceding metal strip and the forward end of a succeeding metal strip. The tail and forward end portions of the two strips which are clamped by respective clampers are cut to required sizes by cutting means which are respectively mounted on frames secured to tables provided with the clampers and which are movable along a passage extending in the lateral direction of the strips. The cut end faces are butted against each other and welded selectively by flash welding or laser beam welding in accordance with the material of the strips. The flash welding is effected by supplying a flash current between the clampers, and the laser beam welding is effected by means of a laser beam machining head which is mounted on the frame secured to either one of the tables and which is movable along said passage. Further, beads produced by the welding are removed by a pair of upper and lower bead removing means which are mounted on the frame secured to either one of the tables and which are movable along said passage. Also disclosed is an apparatus which may suitably be employed to carry out the above-described metal strip connecting method.

8 Claims, 12 Drawing Sheets

METHOD OF AND APPARATUS FOR CONNECTING METAL STRIPS

BACKGROUND OF THE INVENTION

1. Field of the Invention

The present invention relates to a steel process line capable of producing steel products from any types of strip, from common steel to special steel, which are allowed to flow along a single production line at random. More particularly, the present invention pertains to a method of and apparatus for connecting together metal strips which flow successively.

2. Description of the Related Art

Figure 23:
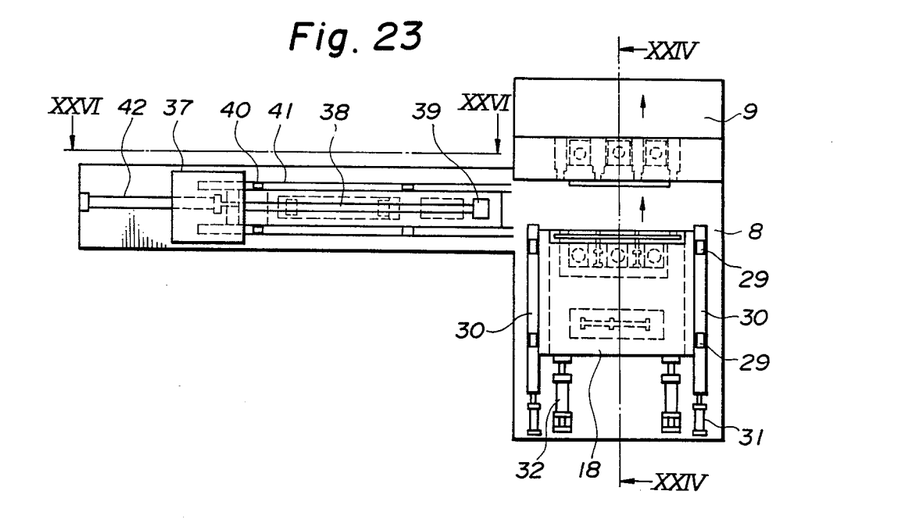
FIG. 23 is a schematic plan view of a conventional metal strip connecting apparatus.
Figure 24:
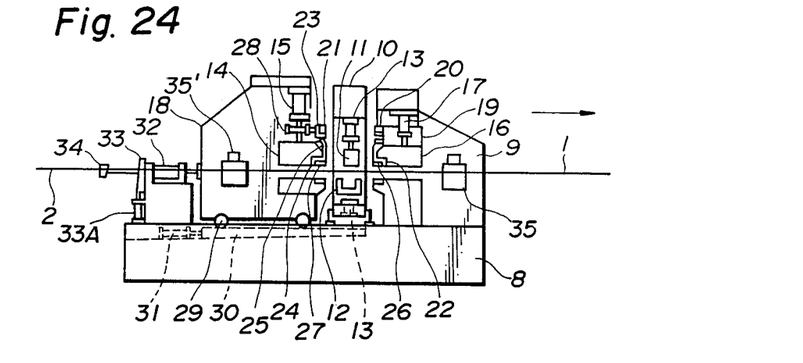
FIG. 24 is a sectional view taken along the line XXIV—XXIV in FIG. 23.
Figure 25:
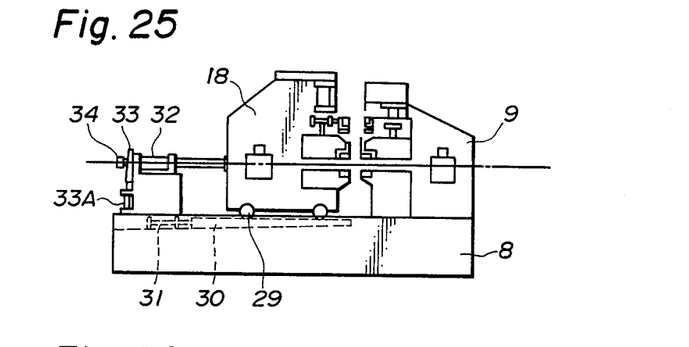
FIG. 25 shows the movable table having moved close to the fixed table.
Figure 26:
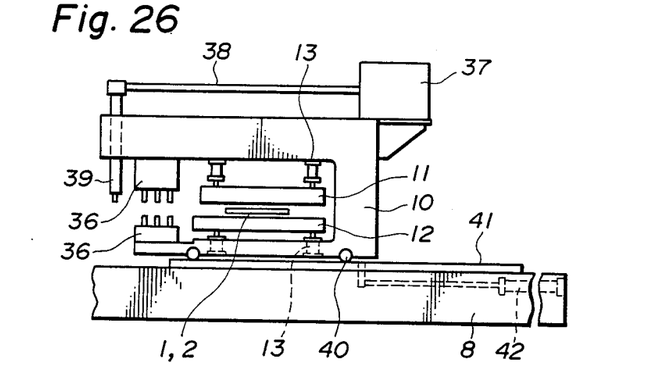
FIG. 26 is a sectional front view taken along the line XXVI—XXVI in FIG. 23.

FIGS. 23 to 26 show in combination a metal strip connecting apparatus proposed prior to the present invention, in which: FIG. 23 is a schematic plan view of the conventional apparatus; FIG. 24 is a sectional view taken along the line XXIV—XXIV in FIG. 23; FIG. 25 is a sectional view similar to FIG. 24, which shows a movable table moved close to a fixed table; and FIG. 26 is a sectional front view taken along the line XXIV—XXIV in FIG. 23. In the figures, the reference numeral 8 denotes a base, 9 a fixed table provided on the base 8, 18 a movable table provided on the base 8 and movable toward and away from the fixed table 9, and 10 a shear frame which is able to enter and withdraw from the area between the fixed table 9 and the movable table 18. As will be clear from FIG. 24, a preceding strip 1 and a succeeding strip 2 are passed through this metal strip connecting apparatus. The fixed table 9 has a clamper 16 for clamping the tail end portion of the preceding strip 1, and a hydraulic means 17 for activating the clamper 16, and the movable table 18 similarly has a clamper 14 for clamping the forward end portion of the succeeding strip 2, and a hydraulic means 15 for activating the clamper 14. The shear frame 10 has a pair of male and female members 11, 12 and a pair of hydraulic means 13 for moving them toward and away from each other.

Thus, with the tail end portion of the strip 1 and the forward end portion of the strip 2 clamped by the respective clampers 14 and 16, these end portions of the strips 1 and 2 are cut by a guillotine type shearing means defined by the male and female members 11 and 12 so that the cut ends of the strips 1 and 2 conform with each other. After the cutting operation, the shear frame 10 is withdrawn, and the movable table 18 is moved close to the fixed table 9 so that the opposing ends of the strips 1 and 2 are butted against each other in order to weld them together. Either flash welding or laser beam welding is selected in accordance with the properties of the materials which are to be connected together.

Referring specifically to FIG. 24, the reference numeral 19 denotes a flash welding transformer, 26 an electrode provided on the clamper 16, 22 a conductor extending from the flash welding transformer 19 to the electrode 26, 27 an electrode provided on the clamper 14, 21 a male portion of a contactor, 23 a conductor connected to the male portion 21 of the contactor, 24 a conductor connected to the electrode 27, 25 a flexible conductor provided between the conductors 24 and 23, 20 a female portion of the contactor connected to the flash welding transformer 19, and 28 a cylinder for extending the male portion 21 of the contactor to the female portion 20 thereof when the movable table 18 is moved close to the fixed table 9 and the respective end portions of the strips 1 and 2 are thereby brought into opposed contact with each other.

In this way, the strips 1 and 2 are connected together by flash welding.

Referring next to FIG. 26, the reference numeral 37 denotes a laser beam oscillator mounted on the shear frame 10, 38 a laser beam transmitter, 39 a laser beam machining head, 40 wheels for moving the frame 10, 41 rails on which the wheels 40 are mounted, and 42 a cylinder for activating the shear frame 10 to advance and withdraw.

When laser beam welding is to be conducted, the laser beam machining head 39 is moved along the butted portions of the strips 1 and 2 by moving the shear frame 10, thus allowing the strips 1 and 2 to be connected together by means of laser beam welding.

The reference numeral 36 in FIG. 26 denotes a pair of upper and lower bead removing means which are mounted on the shear frame 10.

Any beads produced at the weld by flash welding or laser beam welding are removed by moving the shear frame 10 and thereby moving the bead removing means 36 along the weld between the strips 1 and 2.

The movable table 18 has wheels 29 and is movable along rails 30 by the operation of driving cylinders 32 which are provided on the base 8. An upset stop member 33 which is vertically moved by an adjusting cylinder 33A and a stopper 34 which faces and comes into contact with the member 33 are provided in order to limit the distance at which the movable table 18 faces the fixed table 9 at the extremity of its advancement. Further, the movable table 18 is finely adjusted vertically in order to adjust the height of the forward end of the succeeding strip 2 with respect to that of the tail end of the preceding strip 1. This fine adjustment is achieved by longitudinally moving the rails 30 by the operation of respective cylinders 31, each rail 30 having a slanted surface corresponding to a slanted surface of the base 8 (see FIG. 25). In addition, the side edges of the strips 1 and 2 are guided by side guides 35 and 35'.

Figure 21:
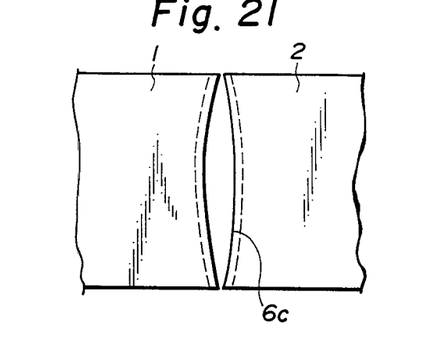
FIG. 21 is a plan view of respective end portions of two strips which are to be butted against each other by a conventional apparatus.
Figure 22:
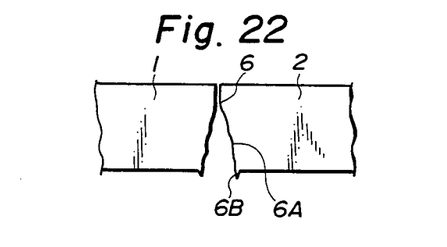
FIG. 22 is a side view of the end portions of the strips shown in FIG. 21.

The conventional metal strip connecting apparatus of the type described above suffers, however, from the following problems. The means for cutting the opposing end portions of the strips 1 and 2 to required sizes is defined by a guillotine type shearing device which consists of the male and female members 11 and 12 extending over the entire width of the strips 1 and 2 and which has a pair of upper and lower hydraulic mechanisms, which means that the size of the cutting means is disadvantageously large. Further, when the bead removing means or the laser beam welding means is activated, the large-sized guillotine type shearing means must also be moved together with it. In addition, a cut face 6 obtained by means of guillotine type shearing may have a generally curved edge 6C as shown in FIG. 21 or may show a fractured section 6A or have a burr 6B as shown in FIG. 22, which involves the problem that it is impossible to effect uniform laser beam welding.

SUMMARY OF THE INVENTION

In view of the above-described circumstances, it is an object of the present invention to provide a metal strip connecting method which enables the size of the metal strip connecting apparatus to be reduced, permits laser beam welding and flash welding to be selectively effected, and allows bead removing and laser beam welding operations to be efficiently carried out.

It is another object of the present invention to provide a metal strip connecting method appendant to the first-described method, which enables the quality of welding effected by, particularly, laser beam welding, not to mention flash welding, to be made even more uniform.

It is still another object of the present invention to provide a metal strip connecting apparatus for carrying out the above-described metal strip connecting method and the method attendant thereto.

To these ends, the present invention provides a metal strip connecting method wherein respective end portions of strips which are to be connected together are cut by cutting means which are respectively mounted on frames secured to tables provided with clampers for clamping the strips and which are movable along a passage extending in the lateral direction of the strips; flash welding is effected by supplying a flash current between the clampers; laser beam welding is effected by means of a laser beam machining head which is mounted on the frame secured to either one of the tables and which is movable along said passage; and a bead removing operation is carried out by a pair of upper and lower bead removing means which are mounted on the frame secured to either one of the tables and which are movable along said passage.

In a method which is attendant to the above-described metal strip connecting method, the end face of each strip is correctively machined by an end face correctively machining means which is mounted on the frame secured to either one of the tables and which is movable along said passage.

According to another aspect of the present invention, there is provided a metal strip connecting apparatus comprising cutting means, a laser beam machining head, bead removing means and end face correctively machining means, which are mounted on a frame secured to a table having a clamper which also serves as a flash electrode in such a manner that these working means are movable in the lateral direction of a strip through guides which are adapted to be used partially in common.

Thus, in the present invention, cutting means, a laser beam machining head and bead removing means are mounted on a frame secured to a table provided with a clamper in such a manner that these working means are independently movable in the lateral direction of a strip. Accordingly, the working means are efficiently activated independently of each other, and since it is unnecessary to provide a relatively large frame such as that for the guillotine type shearing means conventionally employed, it is possible to obtain a metal strip connecting apparatus which is capable of effecting both flash welding and laser beam welding and yet has a reduced size. If the end faces of two strips which are to be connected together are correctively machined by end face machining means in accordance with the method which is attendant to the metal strip connecting method according to the present invention, the butted end portions of the strips are brought into opposed contact with each other uniformly, so that it is possible to improve the quality of welding effected by laser beam welding, not to mention flash welding.

According to the second aspect of the present invention, the guides for guiding the cutting means, the laser beam machining head, the bead removing means and the end face correctively machining means are adapted to be used partially in common, thus enabling a reduction in number of required guides.

The above and other objects, features and advantages of the present invention will become more apparent from the following description of the preferred embodiments thereof, taken in conjunction with the accompanying drawings.

DESCRIPTION OF THE PREFERRED EMBODIMENTS

The present invention will be described hereinunder in detail with reference to the accompanying drawings.

Figure 1:
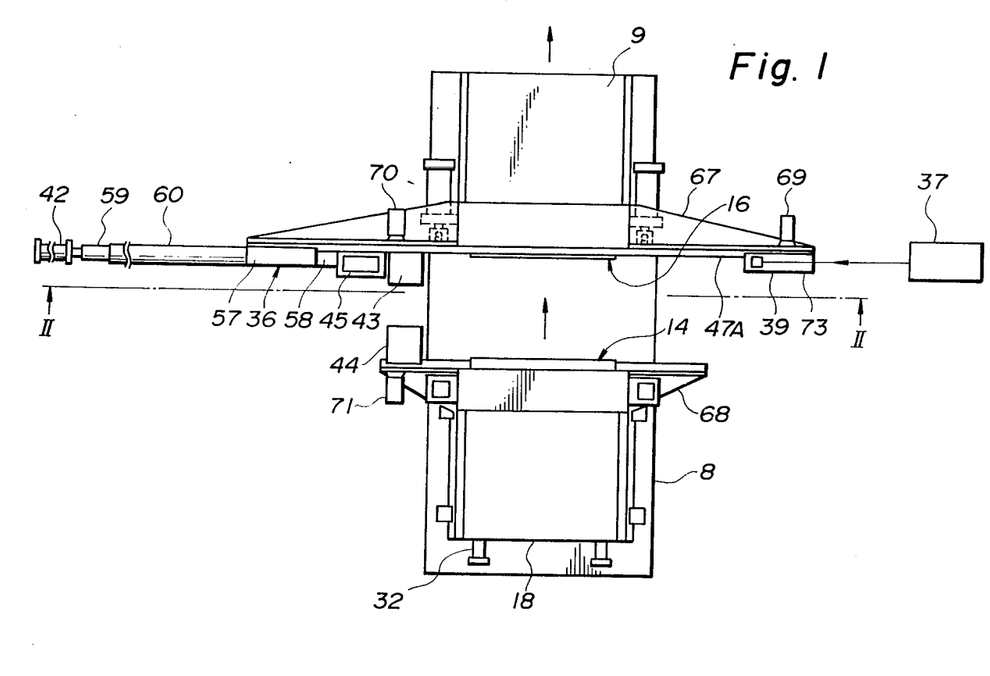
FIG. 1 is a schematic plan view of one embodiment of the present invention.
Figure 2:
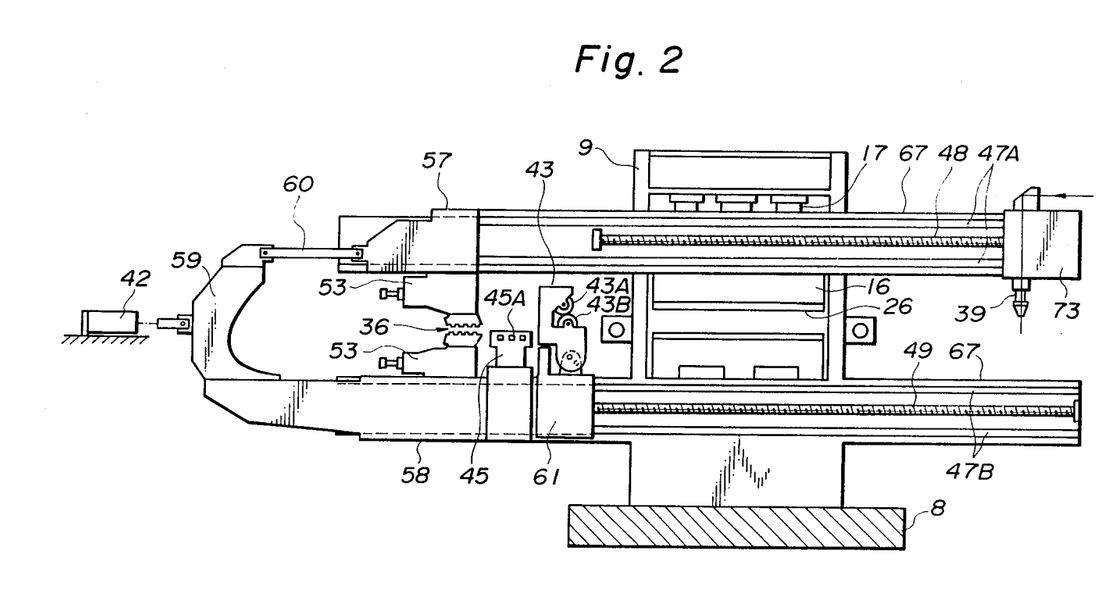
FIG. 2 is a schematic sectional front view taken along the line II—II in FIG. 1.

FIG. 1 is a plan view schematically showing one embodiment of the present invention, and FIG. 2 is a sectional front view taken along the line II—II in FIG. 1. In the figures, the reference numeral 8 denotes a base, 9 a fixed table mounted on the base 8, and 18 a movable table. The arrangements of these constituent elements are substantially similar to those shown in FIGS. 23 to 25 (see the reference numerals 8, 9 and 14 to 35 in these figures).

In the present invention, frames 67 and 68 are respectively secured to opposing portions of the fixed table 9 and the movable table 18, the frames 67 and 68 extending in the lateral direction of the tables 9 and 18. The frame 67 which is provided on the fixed table 9 is defined by a pair of upper and lower frame members as will be understood from FIG. 2. The upper frame member 67 is provided with upper guide bars 47A and a screw shaft 48, whereby a carriage 73 which carries a laser beam machining head 39 is guided and moved in the lateral direction of the fixed table 9. A laser beam oscillator 37 emits a laser beam to the machining head 39. The carriage 73 is moved in the lateral direction of the fixed table 9 in response to the rotation of the screw shaft 48 which is rotated by a driving motor 69. The lower frame member 67 is provided with lower guide bars 47B and a screw shaft 49. A carriage 61 is mounted on the guide bars 47B and the screw shaft 49 in such a manner that the carriage 61 is movable in the lateral direction of the fixed table 9. The carriage 61 is moved in the lateral direction of the fixed table 9 in response to the rotation of the screw shaft 49 which is rotated by a driving motor 70. A rotary shear 43 which consists of a pair of freely rotatable circular knives 43A and 43B is mounted on the carriage 61 in such a manner that the rotary shear 43 can assume two positions, that is, the illustrated erect position and a flattened position. Further, a carriage 57 is mounted on the upper guide bars 47A, and a carriage 58 on the lower guide bars 47B. The carriages 57 and 58 are operatively connected together through a bracket 59 and a link 60 so that the carriages 57 and 58 are moved together in one unit by the operation of a driving cylinder 42. A pair of upper and lower bead removing members 36A which define in combination a bead removing means 36 are respectively mounted on the carriages 57 and 58 in such a manner that the bead removing members 36A are movable toward and away from each other. In addition, an end face correctively machining means 45 is vertically movably mounted on the carriage 58.

The frame 68 which is secured to the movable table 18 is also provided with guide bars and a screw shaft, and a rotary shear 44 is mounted on the guide bars and the screw shaft in a manner similar to that of the above-described rotary shear 43 and is moved in the lateral direction of the movable table 18 by the operation of a driving motor 71.

The operation of the metal strip connecting apparatus arranged as described above will be explained below with reference to FIGS. 10 to 18.

Figure 10:
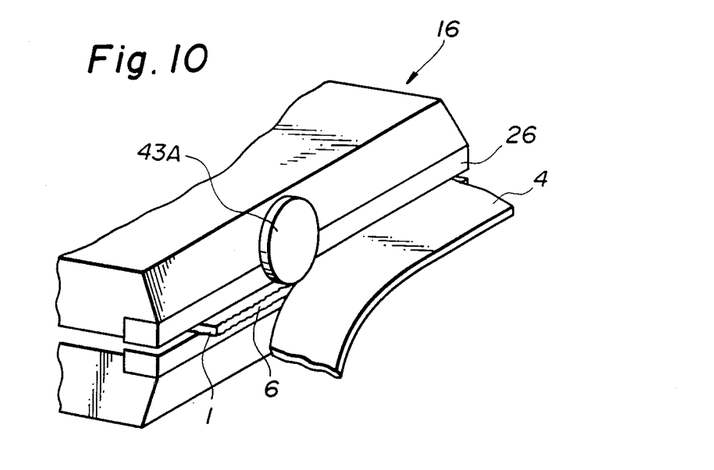
FIG. 10 is a perspective view showing the way in which a strip is cut by one rotary shear.
Figure 12:
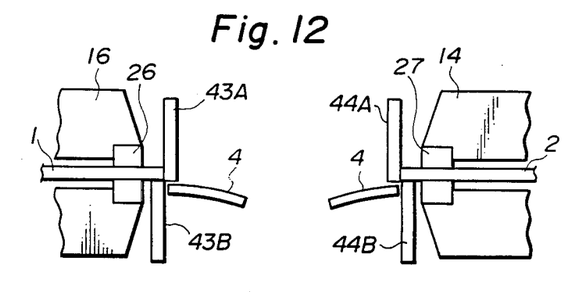
FIG. 12 is a side view showing the way in which two strips are cut by the respective rotary shears, which corresponds to FIG. 10.

As shown in FIGS. 10 and 12, respective end portions of a preceding strip 1 and a succeeding strip 2 which are to be connected together are clamped by the clampers 16 and 14, respectively, and the end portions in this state are cut by the respective rotary shears 43 and 44. The reference numeral 4 denotes scraps produced as a result of cutting. In this way, the end portions of the strips 1 and 2 are cut so that they are in conformity with each other.

Figure 11:
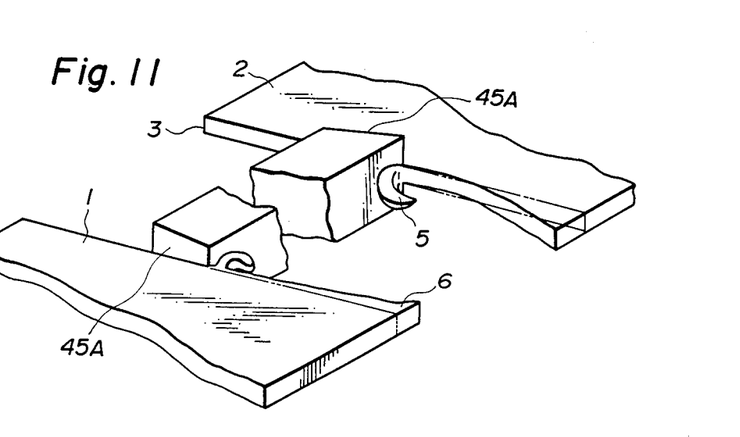
FIG. 11 is a perspective view showing the way in which the cut faces of two strips are correctively machined by the cutting tools of the end face correctively machining means.
Figure 13:
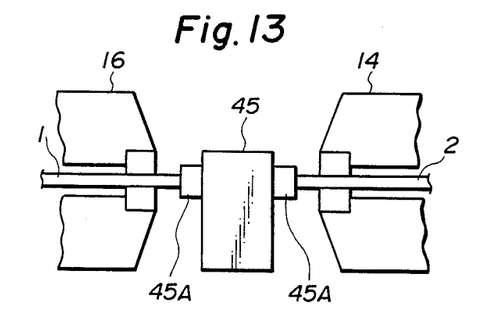
FIG. 13 is a side view corresponding to FIG. 11.
Figure 19:
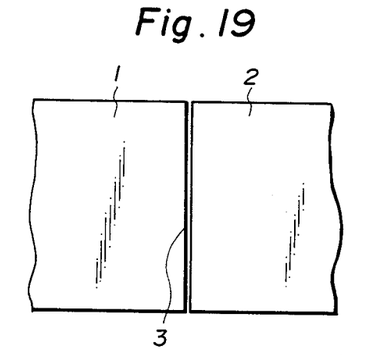
FIG. 19 is a plan view showing respective end portions of two strips which are to be butted against each other by the apparatus according to the present invention.
Figure 20:
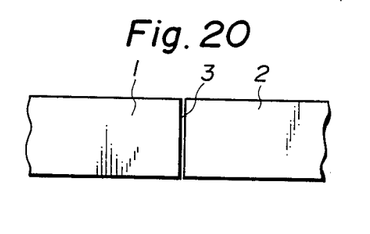
FIG. 20 is a side view of the end portions of the strips shown in FIG. 19.

Then, the cut faces 6 are correctively machined by the end face correctively machining means 45 as shown in FIGS. 11 and 13. The machining means 45 has cutting tools 45A on both sides thereof and is adapted to correctively machine the respective cut faces 6 of the strips 1 and 2 simultaneously. For this purpose, the movable table 18 is slightly advanced to a position (hereinafter referred to as an "intermediate position") where the distance between the cut faces 6 of the strips 1 and 2 is coincident with the distance between the respective outer ends of the cutting tools 45A of the end face correctively machining means 45. The reference numeral 5 denotes swarf produced as a result of cutting. Thus, the end faces 3 of the strips 1 and 2 are made even more uniform so that they are in uniformly opposed contact with each other as shown in FIGS. 19 and 20. Addition of this step enables an improvement in quality of laser beam welding which is carried out in a subsequent step. It should be noted that the end face correctively machining step may be omitted as the case may be.

Figure 14:
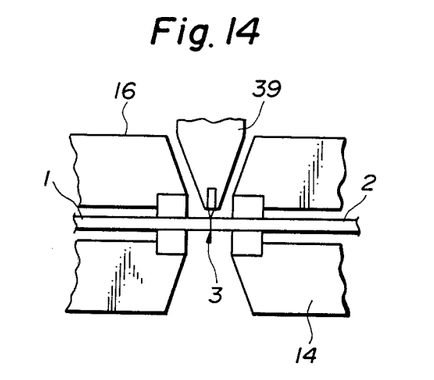
FIG. 14 is a side view showing the way in which two strips are welded together by the laser beam machining head.

Then, the movable table 18 is further moved toward the fixed table 9 so that the end faces 3 of the strips 1 and 2 are butted against each other as shown in FIG. 14. Thus, the laser beam machining head 39 moves along the butted ends to connect the strips 1 and 2 together by laser beam welding.

Figure 15:
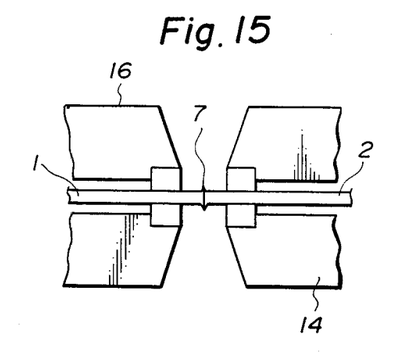
FIG. 15 is a side view showing weld beads.

Weld beads 7 are produced on both sides of the strips 1 and 2 by the welding operation as shown in FIG. 15. These weld beads 7 are removed by the cutting tools 36A of the bead removing means 36 as shown in FIG. 16.

Figures 16, 17:
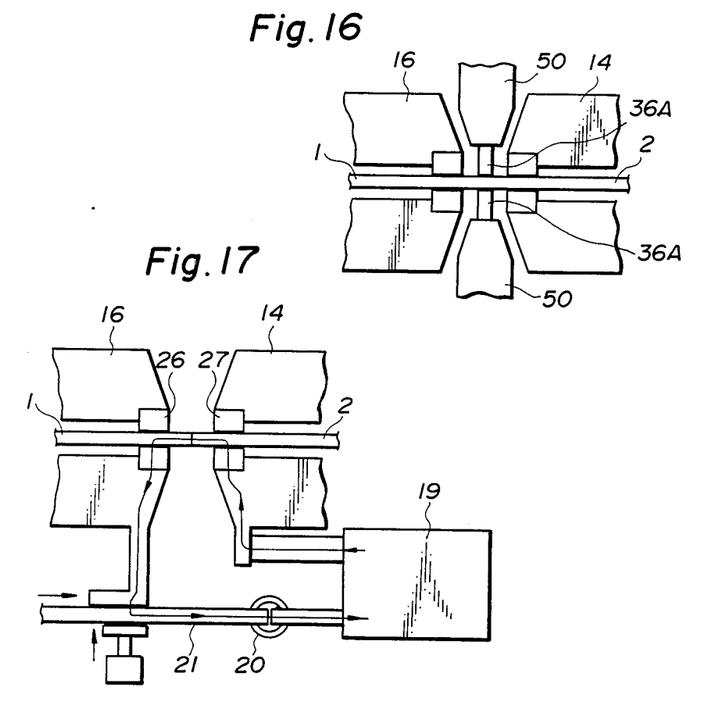
FIG. 16 is a side view showing the way in which the weld beads are removed by the bead removing means.
FIG. 17 shows the way in which a weld obtained by laser beam welding is subjected to a post-heat treatment using the flash welding transformer.

FIG. 17 shows the way in which the weld obtained by laser beam welding is heated by supplying the weld with an electric current using a flash welding power supply for the purpose of subjecting the weld to a post-heat treatment.

Figure 18:
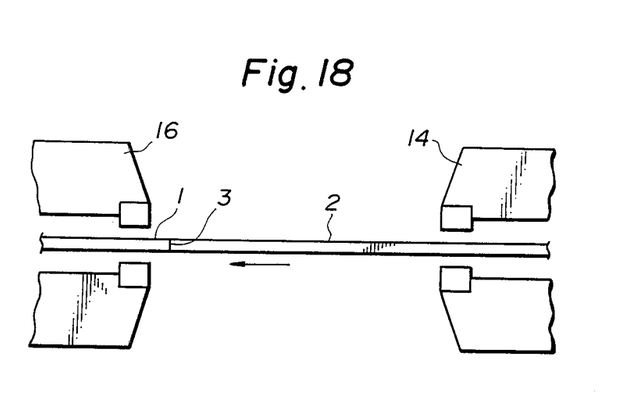
FIG. 18 shows the strips and the clampers after the completion of a strip connecting operation.

When the connection of the metal strips 1 and 2 is completed in this way, the clampers 14 and 16 release the strips 2 and 1 as shown in FIG. 18, and the movable table 18 is moved away from the fixed table 9. Thereafter, the connected strips 1 and 2 are moved in the direction of the arrow shown in FIG. 18.

The above is a description of the operation of the apparatus which is conducted when laser beam welding is carried out; the operation of the apparatus in relation to flash welding will readily be understood with reference to FIGS. 12, 13, 17, 15, 16 and 18 in that order.

A mechanism which enables the end face correctively machining means 45 to be vertically movably mounted on the carriage 58 will be explained below with reference to FIG. 3.

The cutting tool 45A is retained by a tool holder 46. It should be noted that a similar cutting tool 45A is secured to the side of the tool holder 46 which is remote from the first cutting tool 45A. The tool holder 46 is vertically movably guided within a raised portion of the carriage 58. The tool holder 46 is vertically moved by the action of a cylinder 46A. Thus, the end face correctively machining means 45 can assume two positions, that is, an upper operative position and a lower inoperative position. Accordingly, when the end face correctively machining means 45 is in the upper operative position, it can advance while correctively machining the end faces of strips, whereas, when it is in the lower inoperative position, the machining means 45 can return to the starting position without coming into contact with any strips.

Figure 3:
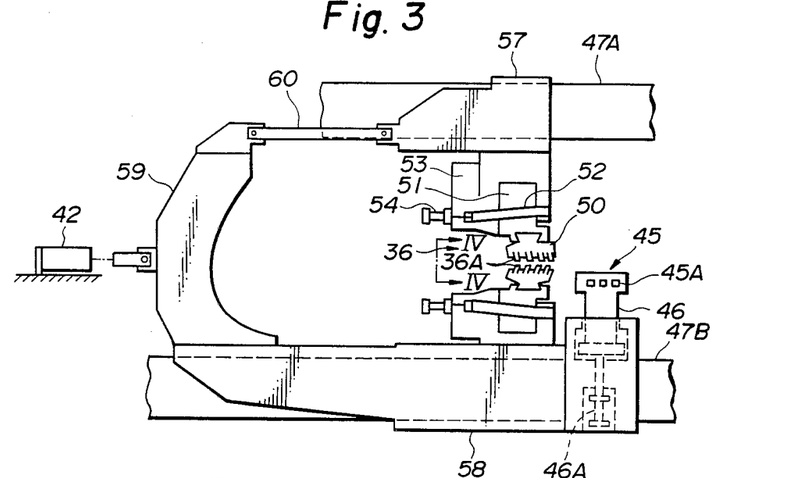
FIG. 3 shows in detail the left-hand portion of FIG. 2.
Figure 4:
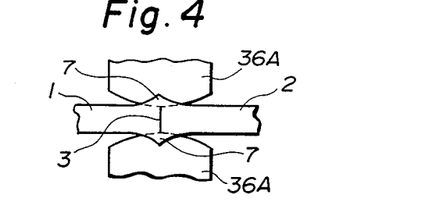
FIG. 4 shows the cutting tools of the bead removing means in an operative position as viewed from the line IV—IV in FIG. 3.
Figure 5:
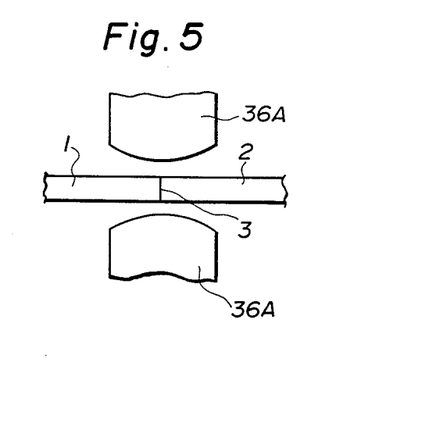
FIG. 5 shows the cutting tools of the bead removing means in an inoperative position.

FIG. 3 further shows a mechanism which enables the bead removing means 36 to be movable between two positions, that is, an operative position at which the means 36 comes into contact with the upper and lower sides of the weld between the strips 1 and 2 and an inoperative position at which the means 36 is separated from said sides. The upper cutting tool 36A is retained by a tool holder 50 which, in turn, is clamped by a holder bracket 51. The holder bracket 51 is vertically movably retained by a main body 53. A slide bar 52 is disposed so as to obliquely extend between the main body 53 and the holder bracket 51, the slide bar 52 being movable horizontally by the action of a cylinder 54. Thus, the cutting tool 36A is moved vertically. The arrangement of the lower cutting tool 36A is similar to that of the upper cutting tool 36A. FIG. 4 is a fragmentary enlarged view showing the pair of cutting tools 36A in the operative position as viewed from the line IV—IV in FIG. 3, and FIG. 5 shows the cutting tools 36A in the inoperative position. Thus, the bead removing means 36 can return to the starting position without coming into contact with any strips.

Figure 6:
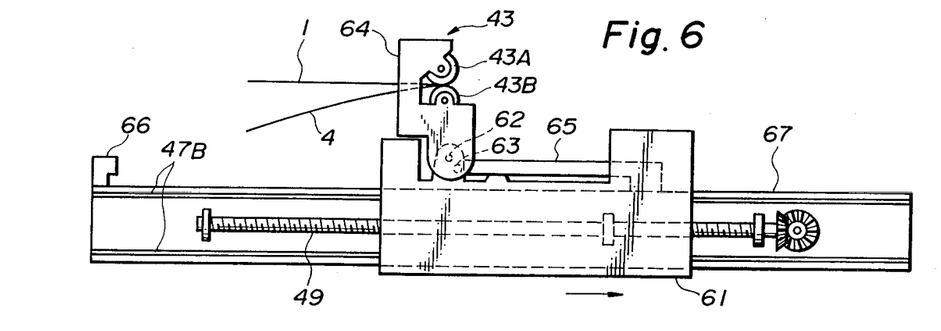
FIG. 6 shows in detail the rotary shear illustrated in FIG. 2.
Figure 7:
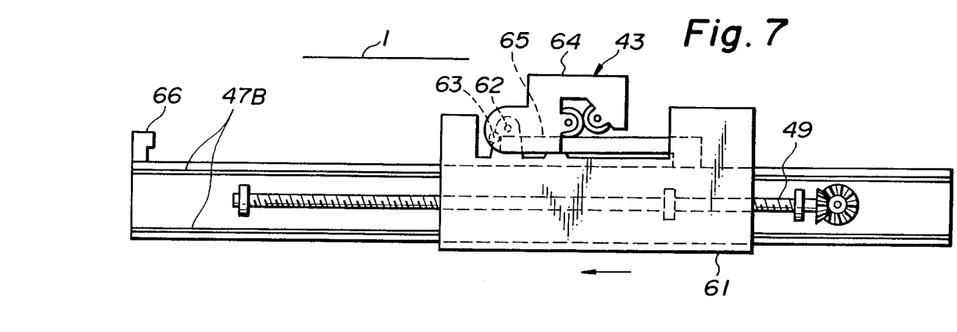
FIG. 7 shows the rotary shear in an inoperative position.

FIGS. 6 and 7 show in combination a mechanism which enables one rotary shear 43 to be pivotal between two positions, that is, an operative position at which it cuts the end portion of the strip 1 and an inoperative position at which the rotary shear 43 is downward separate from the strip 1. A main body 64 which rotatably retains the pair of circular knives 43A and 43B is pivotally supported by the carriage 61 through a pivot 62. The main body 64 has a pin 63. The frame 67 which has the guide bars 47B is provided with stopper 65 and 66, so that the pin 63 is brought into opposed contact with these stoppers 65 and 66 at the two extremities of the stroke of the carriage 61. When the screw shaft 49 is rotated by the driving motor 70, the carriage 61 is moved in the direction of the arrow in FIG. 6, thus allowing the rotary shear 43 to cut the end portion of the strip 1. Thereafter, the pin 63 abuts against the stopper 65, and the main body 64 is thereby caused to turn about the pivot 62 to reach the position shown in FIG. 7. When, in the state shown in FIG. 7, the carriage 61 is moved in the direction of the arrow, the rotary shear 43 can return to the starting position without coming into contact with the strip 1. At the starting position, the pin 63 abuts against the stopper 66, thus causing the main body 64 to erect again.

Another embodiment of the present invention will be described below with reference to FIG. 8 which is a functional view equivalent to a sectional front view taken along the line II—II in FIG. 1. The rotary shear 43, the end face correctively machining means 45, the laser beam machining head 39 and the bead removing means 36 are at the illustrated respective starting positions with respect to the strips 1 and 2 which are to be connected together. The rotary shear 43 is mounted on the carriage 58 and can assume operative and inoperative positions in a manner similar to that shown in FIGS. 6 and 7. The bead removing means 36 can assume operative and inoperative positions in a manner similar to that shown in FIG. 3. The end face correctively machining means 45 is mounted on the carriage 61 and moved vertically in a manner similar to that shown in FIG. 3.

Figure 8:
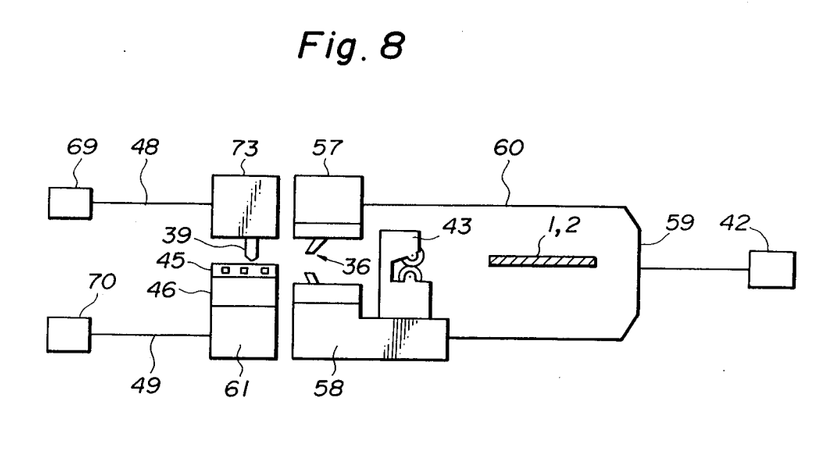
FIG. 8 is a functional view showing another embodiment of the present invention, which is equivalent to a sectional front view taken along the line II—II in FIG. 1.

The carriages 57 and 58 are first moved rightward as viewed in FIG. 8 by activating the driving means 42. At this time, the bead removing means 36 is in the inoperative position, while the rotary shear 43 is in the operative position. Accordingly, the rotary shear 43 cuts the end portion of the strip 1 to the required size as shown in FIG. 10. When this cutting operation is completed, the rotary shear 43 is brought to the inoperative position as shown in FIG. 7. In this state, the carriages 57 and 58 are left at the right-hand extremity of the stroke.

Then, the carriage 61 is moved rightward by activating the driving means 70, and when the end face correctively machining means 45 has cleared the laser beam machining head 39, the means 45 is brought to the operative position to cut the cut faces 6 correctively as shown in FIG. 11. When this cutting operation is completed, the end face correctively machining means 45 is brought to the inoperative position, and the carriage 61 is then returned to the starting position.

Then, the movable table 18 is further advanced so that the respective end faces 3 of the strips 1 and 2 are butted against each other.

Thereafter, the laser beam machining head 39 is moved rightward by activating the driving means 69 to weld the butted portions of the strips 1 and 2 by means of laser beam welding, or the flash power supply is connected to the clampers to subject the butted portions of the strips 1 and 2 to flash welding. When the laser beam welding operation is completed, the laser beam machining head 39 is returned to the starting position. It should be noted that the head 39 is originally mounted on the carriage 73 in such a manner that the head 39 is movable vertically.

Then, the carriages 57 and 58 which have been left at the right-hand extremity of the stroke are returned to the starting position. In the course of this movement, the bead removing means 36 is brought into the operative position. Thus, the bead removing means 36 removes the beads 7 as shown in FIG. 16.

Figure 9:
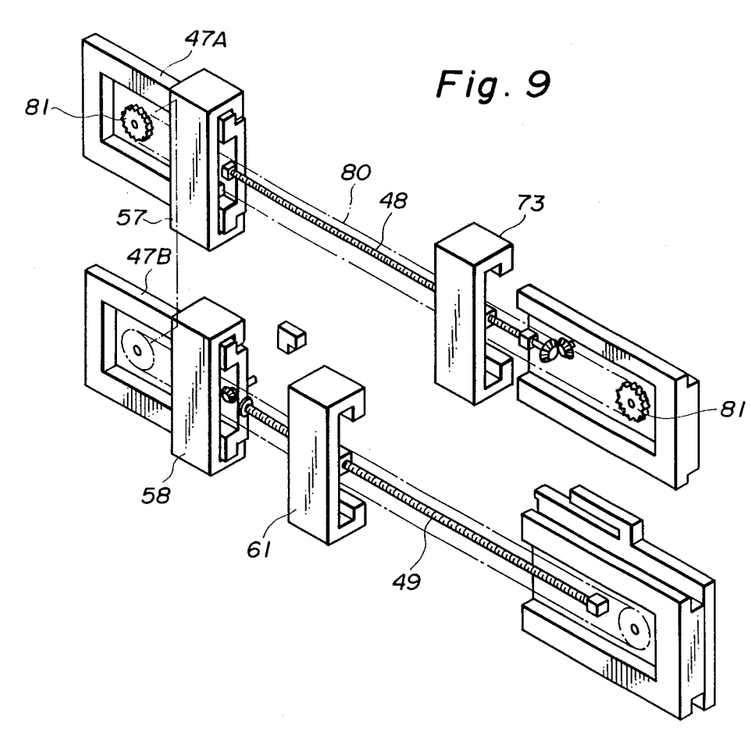
FIG. 9 is a schematic perspective view of a partially modified carriage driving mechanism.

Although in both the above-described embodiments the carriages 57 and 58 are connected together by the bracket 59 and the link 60 so as to move together in one unit, they may be moved by a mechanism having an arrangement different from the above. One example of such mechanism is shown in FIG. 9. As illustrated, a chain 80 and a pair of sprockets 81 for wrapping the chain 80 around them are disposed in a recess longitudinally extending in each of the guide bars 47A and 47B. The carriages 57 and 58 are operatively connected to the chains 80, respectively. The upper and lower sprockets 81 are synchronously rotated by a single driving motor. Thus, the carriages 57 and 58 are moved together in one unit. It should be noted that each of the screw shafts 49 and 48 for respectively driving the carriages 61 and 73 is disposed between the pair of sprockets 81 and within the loop of the chain 80.

Although in both the above-described embodiments the cutting means is defined by a rotary shear, another appropriate cutting means may replace the described one. Further, as the bead removing means, milling cutters, grinders or other appropriate means may also be employed in addition to cutting tools such as those described above. In addition, although the end face correctively machining means is also constituted by cutting tools in the described embodiments, milling cutters, grinders or other appropriate means may also be employed.

In the above-described embodiments, the end face correctively machining means is a single unitized device designed to correctively machine the respective end faces of preceding and succeeding strips at the same time. However, the end face correctively machining means may be defined by separate members which are respectively provided on the fixed and movable tables so as to correctively machine the end faces of the preceding and succeeding strips independently of each other. In such case, it is clear that the movable table need not be moved to the intermediate position.

Further, although in both the above-described embodiments the bead removing means is mounted on the frame secured to the fixed table, the bead removing means may be mounted on the frame secured to the movable table. The same is the case with the laser beam machining head.

As has been described above, according to the present invention, a cutting means, a laser beam machining head and a bead removing means are mounted on a table provided with a clamper in such a manner that these working means are independently movable in the lateral direction of a metal strip. It is therefore possible to obtain a metal strip connecting apparatus which is capable of effecting both flash welding and laser beam welding and which has a reduced size an operates efficiently. If end faces of two strips which are to be connected together are correctively machined by the end face correctively machining means in accordance with the present invention, it is advantageously possible to improve the quality of welding effected by means of laser beam welding.

According to another aspect of the present invention, the guides for guiding the cutting means, the laser beam machining head, the head removing means and the end face correctively machining means are adapted to be used partially in common. It is therefore possible to reduce the number of required guides.

Although the present invention has been described through specific terms, it should be noted here that the described embodiments are not necessarily exclusive and various changes and modifications may be imparted thereto without departing from the scope of the invention which is limited solely by the appended claims. various changes and modifications may be imparted thereto without departing from the scope of the invention which is limited solely by the appended claim.

We claim:

1. In a metal strip connecting method including the steps of: clamping the tail end portion of a preceding metal strip; clamping the forward end portion of a succeeding metal strip; cutting said tail and forward end portion to required sizes; butting said end portion of said succeeding strip against said end portion of said preceding strip; welding the butted portions of said two strips; removing beads produced by the welding; and unclamping each of said strips, thus allowing the connector strips to travel subsequently, the improvement characterized by comprising:
carrying out said cutting step by cutting means which are respectively mounted on frames secured to tables provided with clampers for clamping said strips and which are movable along a passage extending in the lateral direction of said strips;
carrying out said welding step selectively by flash welding or laser-beam welding in accordance with the material of such strips;
effecting said flash welding by supplying a flash current between said clampers;
effecting said laser beam welding by means of a laser beam machining head which is mounted on the frames secured to either one of said tables and which is movable along said passage;
carrying out said bead removing step by a pair of upper and lower bead removing means which are mounted on the frame secured to either one of said tables and which are movable along said passasge;
moving, after said cutting step, said end portion of said succeeding strip toward said end portion of said preceding strip to an intermediate position; and
correctively machining the respective end faces of said preceding and succeeding strips simultaneously by end face correctively machining means which is mounted on the frame secured to either one of said tables and which is movable along said passage.

2. In a metal strip connecting method including the steps of: clamping the tail end portion of a preceding metal strip; clamping the forward end portion of a succeeding metal strip; cutting said tail and forward end portion to required sizes; butting said end portion of said succeeding strip against said end portion of said preceding strip; welding the butted portions of said two strips; removing beads produced by the welding; and unclamping each of said strips, thus allowing the connector strips to travel subsequently, the improvement characterized by comprising:
carrying out said cutting step by cutting means which are respectively mounted on frames secured to tables provided with clampers for clamping said strips and which are movable along a passage extending in the lateral direction of said strips;
carrying out said welding step selectively by flash welding or laser-beam welding in accordance with the material of such strips;
effecting said flash welding by supplying a flash current between said clampers;
effecting said laser beam welding by means of a laser beam machining head which is mounted on the frames secured to either one of said tables and which is movable along said passage;
carrying out said bead removing step by a pair of upper and lower bead removing means which are mounted on the frame secured to either one of said tables and which are movable along said passage; and
supplying, after the step of removing beads produced by the laser beam welding, an electric current between said clampers by using means for flash welding, thereby post-heating the weld obtained by the laser beam welding.

3. A metal strip connecting method according to claim 2 further comprising:
correctively machining, after said cutting step, the respective end faces of said strips independently of each other by end face correctively machining means which are respectively mounted on the frames secured to said tables and which are movable along said passage.

4. A metal strip connecting method according to claim 1 wherein:

said cutting step comprises providing a pair of freely rotatable circular knives to carry out said cutting.

5. A metal strip connecting method according to claim 2 wherein:
said cutting step comprises providing a pair of freely rotatable circular knives to carry out said cutting.

6. In a metal strip connecting method including the steps of: clamping the tail end portion of a preceding metal strip; clamping the forward end portion of a succeeding metal strip; cutting said tail and forward end portions to required against said end portion of said preceding strip; welding the butted portions of said two strips; removing beads produced by the welding; and unclamping each of said strips, thus allowing the connector strips to travel subsequently.
the improvement characterized by comprising:
moving, after said cutting step, said end portion of said succeeding strip toward said end portion of said preceding strip to an intermediate position; and
correctively machining the respective end faces of said preceding and succeeding strips simultaneously by end face correctively machining means which is mounted on the frame secured to either one of said tables and which is movable along said passage.

7. In a metal strip connecting method including the steps of: clamping the tail end portion of a preceding metal strip; clamping the forward end portion of a succeeding metal strip; cutting said tail and forward end portion to required sizes; butting said end portion of said succeeding strip against said end portion of said preceding strip; laser beam welding the butted portions of said two strips; removing beams produced by the welding; and unclamping each of said strips, thus allowing the connector strips to travel subsequently.
the improvement characterized by comprising:
supplying, after the step of removing beads produced by the laser beam welding, an electric current between said clampers by using means for flash welding, thereby post-heating the weld obtained by the laser beam welding.

8. A metal strip connecting method according to claim 7 further comprising:
correctively machining, after said cutting step, the respective end faces of said strips independently of each other by end face correctively machining means which are respectively mounted on the frames secured to said tables and which are movable along said passage.

* * * * *